(12) United States Patent
Jang

(10) Patent No.: US 8,977,213 B2
(45) Date of Patent: Mar. 10, 2015

(54) RECEIVING A MESSAGE IDENTIFYING NEIGHBOR CELLS

(75) Inventor: Ke-Chi Jang, Plano, TX (US)

(73) Assignee: Apple Inc., Cupertino, CA (US)

( * ) Notice: Subject to any disclaimer, the term of this patent is extended or adjusted under 35 U.S.C. 154(b) by 349 days.

(21) Appl. No.: 13/383,142

(22) PCT Filed: Aug. 12, 2010

(86) PCT No.: PCT/US2010/045336
§ 371 (c)(1),
(2), (4) Date: Jan. 9, 2012

(87) PCT Pub. No.: WO2011/019923
PCT Pub. Date: Feb. 17, 2011

(65) Prior Publication Data
US 2012/0108182 A1    May 3, 2012

Related U.S. Application Data

(60) Provisional application No. 61/233,202, filed on Aug. 12, 2009.

(51) Int. Cl.
| | | |
|---|---|---|
| *H04B 1/00* | (2006.01) | |
| *H04B 7/00* | (2006.01) | |
| *H04W 48/16* | (2009.01) | |
| *H04M 1/00* | (2006.01) | |
| *H04W 52/02* | (2009.01) | |
| *H04W 88/08* | (2009.01) | |

(52) U.S. Cl.
CPC .......... *H04W 48/16* (2013.01); *H04W 52/0251* (2013.01); *H04W 88/08* (2013.01); *Y02B 60/50* (2013.01)

USPC .............................................. 455/70; 455/574

(58) Field of Classification Search
CPC ............................... H04W 88/10; Y02B 60/50
USPC .................... 455/446, 443, 429, 70, 572, 574
See application file for complete search history.

(56) References Cited

U.S. PATENT DOCUMENTS

| | | | |
|---|---|---|---|
| 7,110,765 B2 | 9/2006 | Amerga et al. | |
| 8,548,478 B2 * | 10/2013 | Ozluturk | 455/443 |
| 2004/0043798 A1 | 3/2004 | Amerga et al. | |

(Continued)

FOREIGN PATENT DOCUMENTS

| | | |
|---|---|---|
| CN | 101242633 | 8/2008 |
| CN | 102318405 | 1/2012 |

(Continued)

OTHER PUBLICATIONS

Office Action and translation thereof in Russian Patent Application No. 2012109209, issued Nov. 14, 2012, pp. 1-8.

(Continued)

*Primary Examiner* — Eugene Yun
(74) *Attorney, Agent, or Firm* — Meyertons, Hood, Kivlin, Kowert & Goetzel, P.C.

(57) ABSTRACT

While a mobile station is in a reduced power state, the mobile station determines whether the mobile station has up-to-date neighbor cell information. In response to determining that the mobile station does not have up-to-date neighbor cell information, the mobile station transitions from the reduced power state to a higher power state, so that the mobile station can receive a message identifying neighbor cells.

19 Claims, 3 Drawing Sheets

(56) References Cited

U.S. PATENT DOCUMENTS

| | | |
|---|---|---|
| 2004/0116110 A1 | 6/2004 | Amerga et al. |
| 2005/0047429 A1 | 3/2005 | Koo et al. |
| 2006/0034210 A1 | 2/2006 | Chu et al. |
| 2007/0183386 A1 | 8/2007 | Muharemovic et al. |
| 2008/0318643 A1 | 12/2008 | Manna et al. |
| 2009/0191908 A1 | 7/2009 | Kim et al. |

FOREIGN PATENT DOCUMENTS

| | | |
|---|---|---|
| KR | 10-2006-0135460 A1 | 12/2006 |
| KR | 20080066561 | 7/2008 |
| RU | 2113772 | 6/1998 |
| WO | 2010093952 | 8/2010 |

OTHER PUBLICATIONS

International Search Report and Written Opinion dated Feb. 23, 2011 for International Application No. PCT/US2010/045336, International Filing Date: Aug. 12, 2010 consisting of 9-pages.

Office Action from Chinese Application No. 201080035346.5, dated Dec. 16, 2013, English and Chinese versions, pp. 1-77.

3GPP TS 36.304 V8.6.0, "3rd Generation Partnership Project; Technical Specification Group Radio Access Network; Evolved Universal Terrestrial Radio Access (E-UTRA); User Equipment (UE) procedure in Idle Mode (Release 8)", Jun. 2009, pp. 1-30.

3GPP TS 36.133 V8.6.0, "3rd Generation Partnership Project; Technical Specification Group Radio Access Network; Evolved Universal Terrestrial Radio Access (E-UTRA); Requirements for Support of Radio Resource Management", May 2009, pp. 1-258.

3GPP TS 36.331, "3rd Generation Partnership Project; Technical Specification Group Radio Access Network; Evolved Universal Terrestrial Radio Access (E-UTRA); Radio Resource Control (RRC); Protocol Specification", Jun. 2009, pp. 1-207.

Decision on Patent Grant from Russian Application No. 2412-198842RU/8132, mailed May 5, 2014, English and Russian versions, pp. 1-18.

Office Action from Chinese Application No. 201080035346.5, issued May 28, 2014, English and Chinese versions, pp. 1-103.

Office Action from Japanese Application No. 2012-524875, issued Jun. 4, 2014, English and Japanese versions, pp. 1-12.

3rd Generation Partnership Project 2, "Message Structure and Supervision for HRPD to LTE Reselection", Ke-Chi Jang, et al., pp. 1-7, May 2009.

* cited by examiner

US 8,977,213 B2

RECEIVING A MESSAGE IDENTIFYING NEIGHBOR CELLS

CROSS-REFERENCE TO RELATED APPLICATIONS

This application is a Submission Under 35 U.S.C. §371 for U.S. National Stage Patent Application of International Application Number: PCT/US2010/045336, filed Aug. 12, 2010 entitled "RECEIVING A MESSAGE IDENTIFYING NEIGHBOR CELLS," which claims priority to U.S. Provisional Application Ser. No. 61/233,202, filed Aug. 12, 2009, the entirety of both which are incorporated herein by reference.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2. CDMA 2000 defines one type of packet-switched wireless access network, referred to as the HRPD (High Rate Packet Data) wireless access network.

Another more recent standard that provides packet-switched wireless access networks is the Long Term Evolution (LTE) standard from 3GPP, which seeks to enhance the UMTS technology. The LTE standard is also referred to as the EUTRA (Evolved Universal Terrestrial Radio Access) standard. The EUTRA technology is considered to be fourth generation (4G) technology, to which wireless network operators are migrating to provide enhanced services. Another alternative 4G wireless technology is WiMAX (Worldwide Interoperability for Microwave Access), as defined by IEEE 802.16.

SUMMARY

In general, while a mobile station is in a reduced power state, the mobile station determines whether the mobile station has up-to-date neighbor cell information. In response to determining that the mobile station does not have up-to-date neighbor cell information, the mobile station transitions from the reduced power state to a higher power state, so that the mobile station can receive a message identifying neighbor cells.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
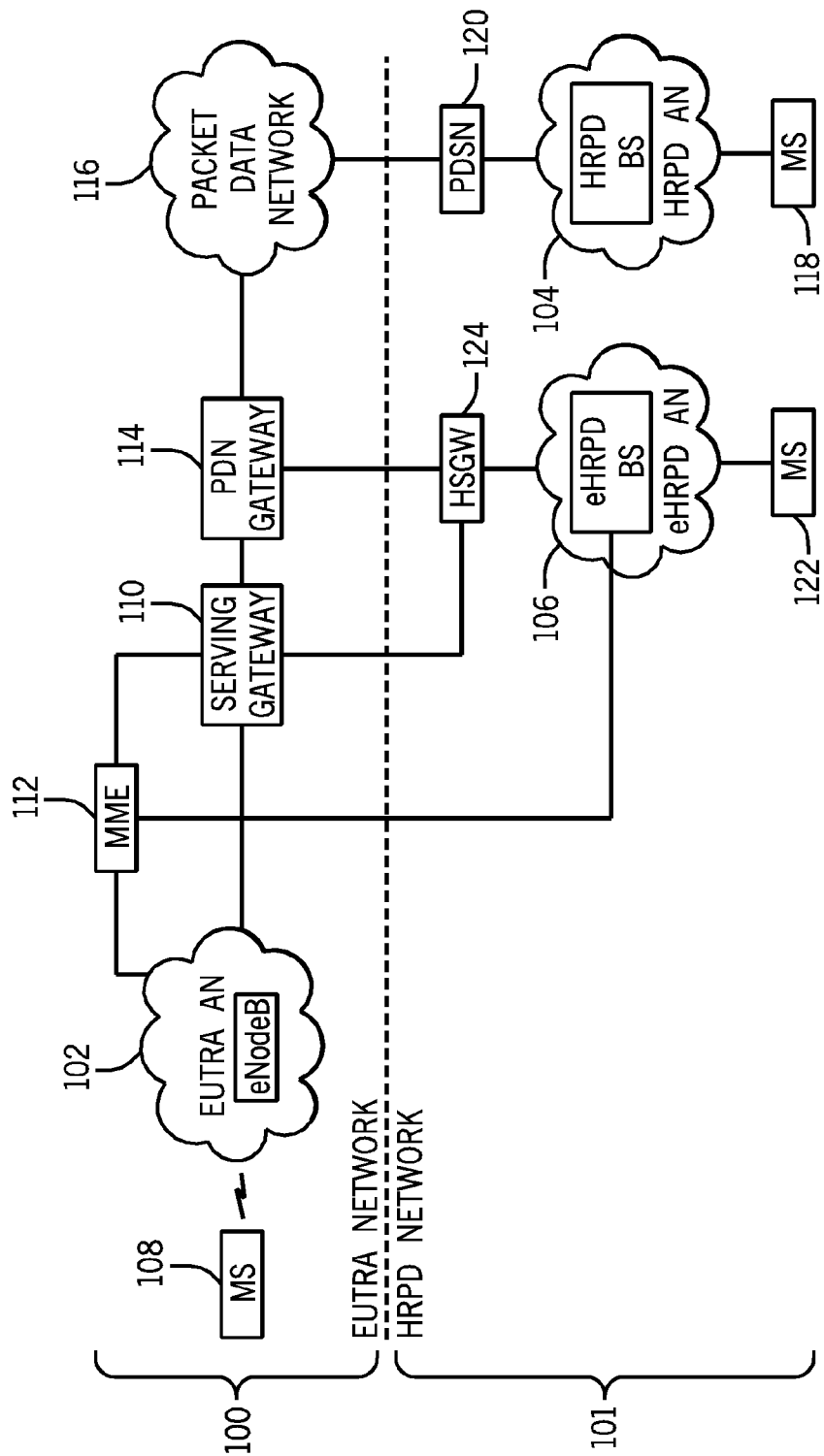
FIG. 1 illustrates an example arrangement of a mobile telecommunications network incorporating some embodiments.

Wireless network operators are migrating to fourth generation (4G) wireless networks. One such type of 4G wireless network is the Long Term Evolution (LTE) wireless network, as defined by the Third Generation Partnership Project (3GPP). The LTE standard is also referred to as the EUTRA (Evolved Universal Terrestrial Radio Access) standard. Another alternative 4G wireless technology is WiMAX (Worldwide Interoperability for Microwave Access), as defined by IEEE 802.16.

As part of the migration, wireless network operators may deploy access networks of different technologies such that mobile stations can seamlessly operate with either or both of the access networks of different technologies. For example, mobile stations can be handed off from an access network of a first technology to an access network of a second, different technology. Alternatively, mobile stations can perform cell selection when initially starting up from among the access networks of the different technologies. In some examples, a wireless network operator can operate both HRPD (High Rate Packet Data) access networks and EUTRA access networks. HRPD is defined by the CDMA (Code Division Multiple Access) 2000 standards, as established by 3GPP2.

HRPD is an example of a third generation (3G) wireless technology. Another example of the 3G wireless technology is the Universal Mobile Telecommunication System (UMTS) technology, as defined by 3GPP. Yet another example of a 3G wireless technology is the EDGE (Enhanced Data Rates for GSM Evolution) technology, as defined by 3GPP.

In other examples, other wireless protocols can be used. In the ensuing discussion, reference is made to implementations that employ the HRPD and EUTRA technologies. It is noted that in other implementations, other combinations of technologies can be employed.

In some implementations, the migration from HRPD to EUTRA involves use of evolved HRPD (eHRPD) technology. An eHRPD wireless access network is capable of interworking with an EUTRA wireless access network. A mobile station that supports the eHRPD technology can be handed off between the eHRPD access network and an EUTRA access network. Additionally, a mobile station that supports eHRPD can perform cell re-selection on either EUTRA or eHRPD access networks.

A network can thus include both HRPD cells and EUTRA cells, where an HRPD cell includes either an HRPD access network or an eHRPD access network, and where an EUTRA cell includes an EUTRA access network. Some of the HRPD cells may overlap with EUTRA cells. A "cell" can refer to an entire cell, a cell sector, or any other segment of a cell.

In accordance with some embodiments, techniques or mechanisms are provided to define procedures that a mobile station should follow to effectively receive information regarding EUTRA cells while the mobile station is attached to an HRPD access network. More generally, techniques or mechanisms are provided to allow a mobile station that is attached to a wireless access network according to a first technology to receive a message containing a list of neighbor cells that are according to a second, different wireless technology.

According to some implementations, a configuration message can be sent from an HRPD access network to a mobile station, where the configuration message contains a field to indicate whether or not the HRPD access network supports sending of OtherRATNeighborList messages, where an OtherRATNeighborList message is a message that contains a list of neighboring cells with access technologies other than HRPD. More generally, the OtherRATNeighborList message contains a list of neighbor cells with access technologies different from the access technology of the access network that the mobile station is currently attached to. Although reference is made to a specific message names in this discussion (e.g., "OtherRATNeighborList message"), it is noted that other examples can use messages of different names.

The OtherRATNeighborList message contains various fields, some of which are discussed below. A signature field (referred to as an OtherRATSignature field) can be included in the OtherRATNeighborList message. The OtherRATSignature field is changed by the access network if the content of the OtherRATNeighborList message changes. A change in the signature field indicates to a mobile station that the mobile station should monitor the next transmission of the OtherRATNeighborList message, since the list of neighbor cells of different access technology(ies) may have changed.

The OtherRATNeighborList message can also contain a field indicating the type(s) of radio access technology used by the neighbor cells identified by the OtherRATNeighborList message. The OtherRATNeighborList message can also contain other fields.

The configuration message that is sent by the HRPD access network to the mobile station can be a QuickConfig message. In addition to an indication that the HRPD access network supports the sending of the OtherRATNeighborList message, the QuickConfig message can also contain other fields, such as a timing field containing information relating to the timing of sending of OtherRATNeighborList messages. For example, the timing field can specify the transmission cycle of the OtherRATNeighborList message (e.g., the OtherRATNeighborList message can be sent by the access network every N control channel cycles, where N can be one or more). The timing field can be used by the mobile station to determine when the next OtherRATNeighborList message will be sent by the HRPD access network, such that the mobile station can monitor for this next OtherRATNeighborList message at the proper time.

Another field that can be in the QuickConfig message is a signature field (e.g., OtherRATSignature field), which is set by the access network to indicate to the mobile station the signature of the next OtherRATNeighborList message that the access network will send.

Based on receiving the QuickConfig message, a mobile station can determine whether transmission of the OtherRATNeighborList message is supported, and how frequently (in terms of specified time intervals) the access network will be sending the OtherRATNeighborList message. Based on the information in the QuickConfig message, the mobile station can monitor for the next OtherRATNeighborList message if one or more conditions are met. For example, the mobile station can monitor for the next OtherRATNeighborList message if the mobile station determines that neighbor cell information is not up-to-date, such as based on receiving a QuickConfig message having a signature field (e.g., OtherRATSignature field) that is different from the signature field (e.g., OtherRATSignature field) of the last OtherRATNeighborList message. The mobile station is able to compare whether the OtherRATSignature field of the QuickConfig message is different from the OtherRATSignature field of the last received OtherRATNeighborList message.

To conserve power, a mobile station may enter a lower power state (which can be referred to as a sleep state in some examples). Generally, in the lower power state, the mobile station has certain components that are powered down or inactive. In some examples, in the lower power state, the mobile station does not monitor the forward channel from the access network. Further, it may be that the access network is not allowed to transmit unicast packets to the mobile station. To receive forward channel information, the mobile station can transition from the lower power state to a higher power state (such as a monitor state or other higher power state). In the higher power state, the mobile station is able to monitor the forward control channel to listen for certain control messages, including the OtherRATNeighborList message.

FIG. 1 illustrates an example arrangement that includes different mobile communications networks, including EUTRA network 100 and HRPD network 101. The EUTRA mobile communications network 100 includes an EUTRA access network 102, and the HRPD network 101 includes an HRPD access network 104 and an eHRPD access network 106. Although just one EUTRA access network 102, one HRPD access network 104, and one eHRPD access network 106 are depicted in FIG. 1, it is noted that typically there would be multiple EUTRA access networks, multiple HRPD access networks, and multiple eHRPD access networks. As used here, the term "access network" or "wireless access network" refers to equipment used to allow a mobile station to wirelessly connect through the access network for accessing services provided on a target network, such as a packet data network 116.

According to the EUTRA technology, the EUTRA access network 102 includes an enhanced node B (eNode B), which is a type of base station. The HRPD access network 104 includes an HRPD base station, and the eHRPD access network 106 includes an eHRPD base station. A base station can perform one or more of the following tasks: radio resource management, mobility management for managing mobility of mobile stations, routing of traffic, and so forth. Generally, the term "base station" can refer to a cellular network base station or access point used in any type of wireless network, or any type of wireless transmitter/receiver to communicate with mobile stations. The term "base station" can also encompass an associated controller, such as a base station controller or a radio network controller. It is contemplated that the term "base station" also refers to a femto base station or access point, a micro base station or access point, or a pico base station or access point. A "mobile station" can refer to a telephone handset, a portable computer, a personal digital assistant (PDA), or an embedded device such as a health monitor, attack alarm, and so forth.

As depicted in FIG. 1, in the EUTRA mobile communications network 100, a mobile station 108 connects wirelessly to the EUTRA access network 102. The EUTRA access network 102 is in turn connected to various components, including a serving gateway 110 and a mobility management entity (MME) 112. The MME 112 is a control node for the EUTRA access network 102. For example, the MME 112 is responsible for idle mode mobile station tracking and paging procedures. The MME 112 is also responsible for choosing the serving gateway for a mobile station at initial attach and at time of handover. The MME 112 is also responsible for authenticating the user of the mobile station.

The serving gateway 110 routes bearer data packets. The serving gateway 110 also acts as a mobility anchor for the user plane during handovers between different access networks. The serving gateway 110 is also connected to a packet data network (PDN) gateway 114 that provides connectivity between the mobile station 108 and the packet data network 116 (e.g., the Internet, a network that provides various service, etc.).

In the HRPD mobile communications network 101, a mobile station 118 connects wirelessly with the HRPD access network 104. The HRPD access network 104 is in turn connected to a packet data serving node (PDSN) 120, which in turn is connected to the packet data network 116.

Also, to allow for interworking between the HRPD network 101 and the EUTRA network 100, the eHRPD access network 106 is provided that wirelessly connects to a mobile station 122. The eHRPD access network 106 is in turn connected to an HRPD serving gateway (HSGW) 124. The HSGW 124 is the entity that terminates the eHRPD access network interface from the eHRPD access network 106. The HSGW 124 routes mobile station-originated or mobile station-terminated packet data traffic. The HSGW 124 provides interworking of the mobile station with the EUTRA network 100. The interworking functions include support for mobility, policy control and charging, access authentication, roaming, and others. The HSGW 124 supports seamless inter-technology mobility transfer between the EUTRA network 100 and the eHRPD access network 106.

Reference to the EUTRA, HRPD, and eHRPD (and other) standards is intended to refer to the current standards, as well as standards that evolve over time. It is expected that future standards evolve from EUTRA, HRPD, or eHRPD (or other standards) may be referred by different names. It is contemplated that reference to "EUTRA," "HRPD," or "eHRPD" (or another standard) is intended to cover such subsequently evolved standards as well. Also, as noted above, techniques or mechanisms are applicable for systems employing other types of wireless protocols.

Figure 2:
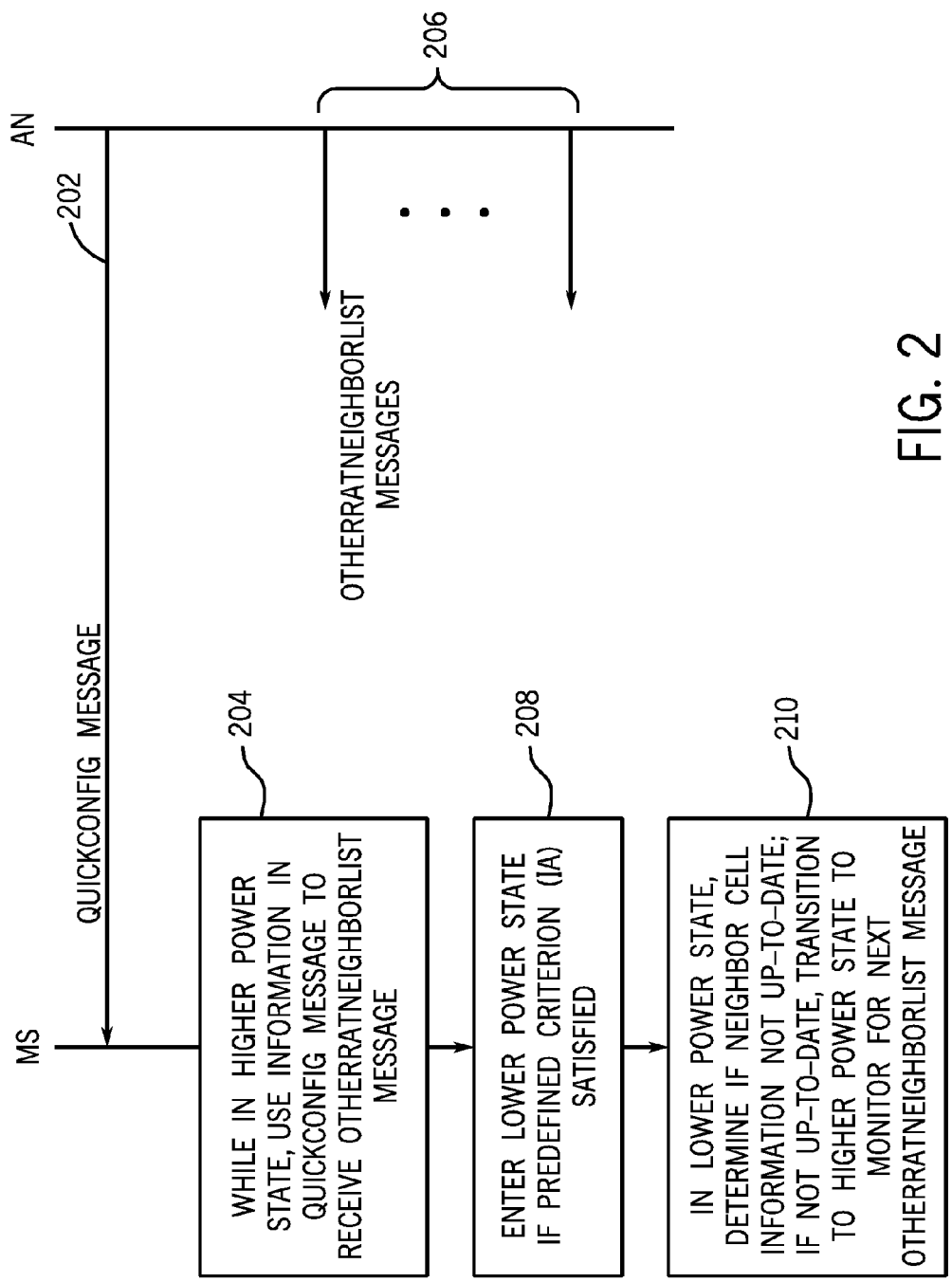
FIG. 2 is a message flow diagram of a process performed according to some embodiments.

FIG. 2 is a message flow diagram of a process according to some embodiments. The access network (e.g., HRPD access network) sends (at 202) a QuickConfig message to the mobile station. The QuickConfig message can contain content as discussed above. While the mobile station is in a higher power state, the mobile station uses (at 204) information in the QuickConfig message to receive OtherRATNeighborList messages sent (at (206) by the access network.

To conserve battery power, the mobile station can enter (at 208) a lower power state if predetermined criterion(ia) is (are) satisfied. For example, if all overhead parameters are up-to-date, then the mobile station can enter the lower power state. If the overhead parameters are not up-to-date, the mobile station will remain in a higher power state to receive an overhead parameters message (e.g., SectorParameters message) that is used to convey sector-specific overhead information to mobile stations.

In the lower power state, if the mobile station determines that the neighbor cell information is not up-to-date, then the mobile station transitions (at 210) from the lower power state to the higher power state. The timing of the transition from the lower power state to the higher power state can be based on a determination by the mobile station regarding when the next OtherRATNeighborList message will be sent. The mobile station can make this determination based on the timing field contained in the QuickConfig message, for example. The mobile station transitions from the lower power state to the higher power state at a time that is relatively close (to within a predefined time range) to when receipt of the next OtherRATNeighborList message is expected. By transitioning the mobile station from the lower power state to the higher power state just in time to receive the next OtherRATNeighborList message, power conservation is enhanced since the mobile station does not transition to the higher power state too early.

By using techniques or mechanisms according to some embodiments, the mobile station is able to more reliably and efficiently obtain information regarding neighbor cells of a different radio access technology while the mobile station is attached to an access network of a first radio access technology. The mobile station is allowed to enter into a reduced power state to achieve power savings while still being able to obtain information relating to other radio access technology cells, such that the mobile station can perform more effective handoff or cell selection.

Figure 3:
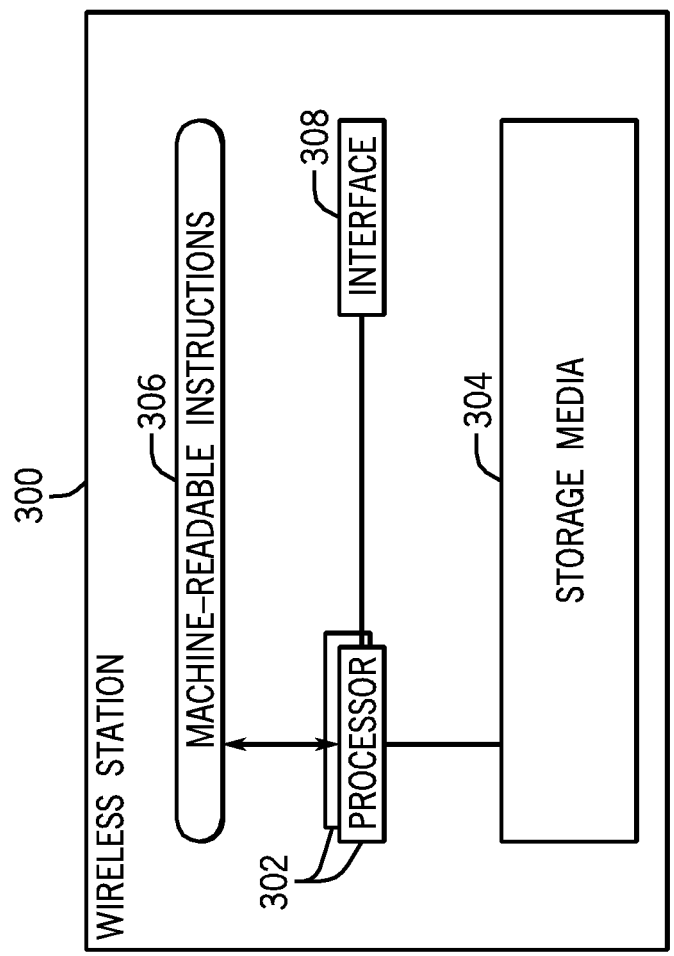
FIG. 3 is a block diagram of a wireless station according to some examples.

FIG. 3 is a block diagram of a wireless station 300, which can either be a mobile station (e.g., mobile station 108, 118, or 122 in FIG. 1) or a base station (e.g., eNodeB, HRPD base station, or eHRPD base station in FIG. 1). The wireless station 300 includes a processor (or multiple processors) 302, which is (are) connected to storage media 304. Machine readable instructions 306 are executable on the processor(s) 302 to perform respective tasks associated with the wireless station 300, such as tasks depicted in FIG. 2 or 3. The wireless station 300 also includes an interface 308 for communicating over a wireless link, such as a radio frequency (RF) link.

The machine-readable instructions 306 are loaded for execution on the processor(s) 302. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:

determining, by a mobile station while the mobile station is in a reduced power state, whether the mobile station has up-to-date neighbor cell information;

in response to determining that the mobile station does not have up-to-date neighbor cell information, transitioning the mobile station from the reduced power state to a higher power state;

receiving, by the mobile station from the access network, a configuration message containing a field indicating whether or not the access network sends messages identifying neighbor cells of a different access technology; and receiving, by the mobile station while the mobile station is in the higher power state, a message identifying neighbor cells, wherein the mobile station is attached to a wireless access network according to a first wireless technology, and wherein the message identifies neighbor cells that are according to a second, different wireless technology.

2. The method of claim 1, wherein the second wireless technology is an EUTRA (Evolved Universal Terrestrial Radio Access) technology.

3. The method of claim 2, wherein the first wireless technology is a third generation (3G) wireless technology.

4. The method of claim 1, further comprising:
calculating, by the mobile station, a time at which an access network will next send the message, wherein transitioning the mobile station from the lower power state to the higher power state occurs at a time based on the calculated time.

5. The method of claim 4, wherein the configuration message contains another field from which the mobile station computes the calculated time.

6. The method of claim 1, wherein the configuration message is a QuickConfig message.

7. A non-transitory computer accessible storage medium storing instructions that upon execution cause a mobile station to:
determine, while the mobile station is in a reduced power state, whether the mobile station has up-to-date neighbor cell information;
in response to determining that the mobile station does not have up-to-date neighbor cell information, transition the mobile station from the reduced power state to a higher power state;
receive from the access network, a configuration message containing a field indicating whether or not the access network sends messages identifying neighbor cells of a different access technology; and
receive, while the mobile station is in the higher power state, a message identifying neighbor cells, wherein the mobile station is attached to a wireless access network according to a first wireless technology, and wherein the message identifies neighbor cells that are according to a second, different wireless technology.

8. The non-transitory computer accessible storage medium of claim 7, wherein the second wireless technology is an EUTRA (Evolved Universal Terrestrial Radio Access) technology.

9. The non-transitory computer accessible storage medium of claim 8, wherein the first wireless technology is a third generation (3G) wireless technology.

10. The non-transitory computer accessible storage medium of claim 7, wherein the instructions upon execution cause the mobile station to further:
calculate a time at which an access network will next send the message, wherein transitioning the mobile station from the lower power state to the higher power state occurs at a time based on the calculated time.

11. The non-transitory computer accessible storage medium of claim 7 wherein the configuration message contains another field from which the mobile station computes the calculated time.

12. The non-transitory computer accessible storage medium of claim 11, wherein the configuration message further contains a signature field, and wherein the instructions upon execution cause the mobile station to further:
use the signature field to determine whether the neighbor cell information is not up-to-date.

13. A mobile station, comprising:
a wireless interface to communicate wirelessly; and
at least one processor configured to:
determine while the mobile station is in a reduced power state, whether the mobile station has up-to-date neighbor cell information;
in response to determining that the mobile station does not have up-to-date neighbor cell information, transition the mobile station from the reduced power state to a higher power state;
receive from the access network, a configuration message containing a field indicating whether or not the access network sends messages identifying neighbor cells of a different access technology; and
receive while the mobile station is in the higher power state, a message identifying neighbor cells, wherein the mobile station is attached to a wireless access network according to a first wireless technology, and wherein the message identifies neighbor cells that are according to a second, different wireless technology.

14. The mobile station of claim 13, wherein the second wireless technology is an EUTRA (Evolved Universal Terrestrial Radio Access) technology.

15. The mobile station of claim 14, wherein the first wireless technology is a third generation (3G) wireless technology.

16. The mobile station of claim 13, wherein the at least one processor is further configured to:
calculate a time at which an access network will next send the message, wherein transitioning the mobile station from the lower power state to the higher power state occurs at a time based on the calculated time.

17. The mobile station of claim 16, wherein the configuration message contains another field from which the mobile station computes the calculated time.

18. The mobile station of claim 13, wherein the configuration message is a QuickConfig message.

19. The mobile station of claim 13, wherein the configuration message further contains a signature field, and wherein the at least one processor is further configured to:
use the signature field to determine whether the neighbor cell information is not up-to-date.

* * * * *